United States Patent [19]
Weingarten

[11] 3,897,919
[45] Aug. 5, 1975

[54] INTEGRAL AIRCRAFT BARRIER NET

[75] Inventor: Joseph L. Weingarten, Kettering, Ohio

[73] Assignee: The United States of America as represented by the Secretary of the Air Force, Washington, D.C.

[22] Filed: Feb. 13, 1974

[21] Appl. No.: 442,296

[52] U.S. Cl. .......................... 244/118 R; 105/467
[51] Int. Cl............................................ B64d 9/00
[58] Field of Search. 244/118 R; 105/369 R, 369 A, 105/369 B, 463, 466, 467; 280/179 A

[56] References Cited
UNITED STATES PATENTS

| | | | |
|---|---|---|---|
| 2,605,064 | 7/1952 | Davis | 244/118 R |
| 2,705,461 | 4/1955 | Campbell | 105/369 B |
| 3,099,313 | 7/1963 | Peck et al. | 105/369 B X |
| 3,294,034 | 12/1966 | Bodenheimer et al. | 105/369 A X |

FOREIGN PATENTS OR APPLICATIONS

| | | | |
|---|---|---|---|
| 793,589 | 9/1968 | Canada | 105/369 A |

Primary Examiner—Duane A. Reger
Assistant Examiner—Paul E. Sauberer
Attorney, Agent, or Firm—Joseph E. Rusz; Arthur R. Parker

[57] ABSTRACT

An air cargo barrier net having a front net section releasably attached within an aircraft cargo compartment in restraining contact with the forwardmost cargo load, an integral top net section attached over the upper surface of the cargo load, and connecting lines quick-releasably connected from the front and top net sections to existing cargo tiedown rings installed on the floor of the cargo compartment. The upper surface of the front net section is slidably attached to a pair of horizontal tracks mounted on the ceiling of the cargo compartment and permitting the easy relocation of the net to various positions in the cargo compartment.

2 Claims, 6 Drawing Figures

PATENTED AUG 5 1975                    3,897,919

SHEET     2

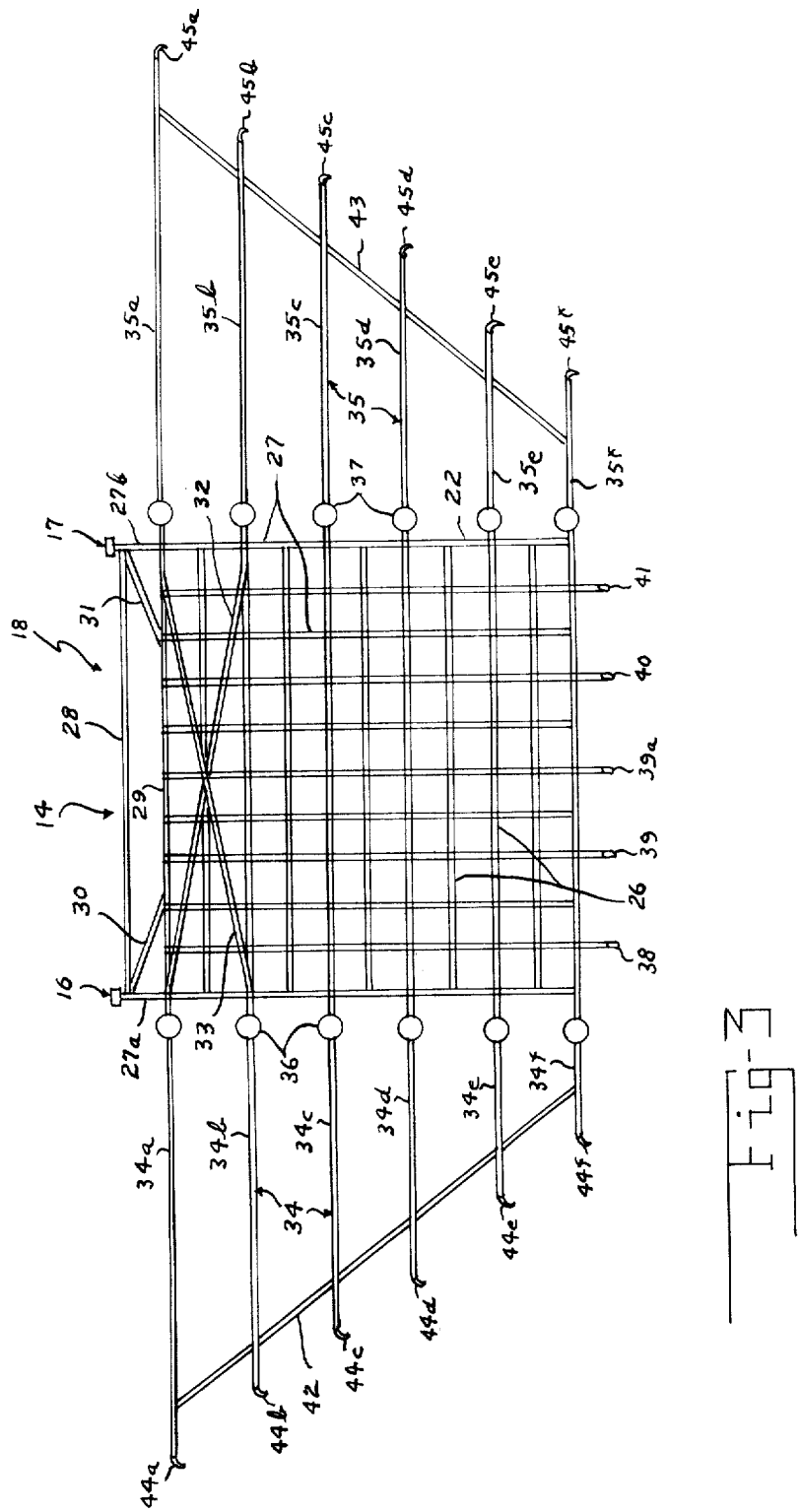

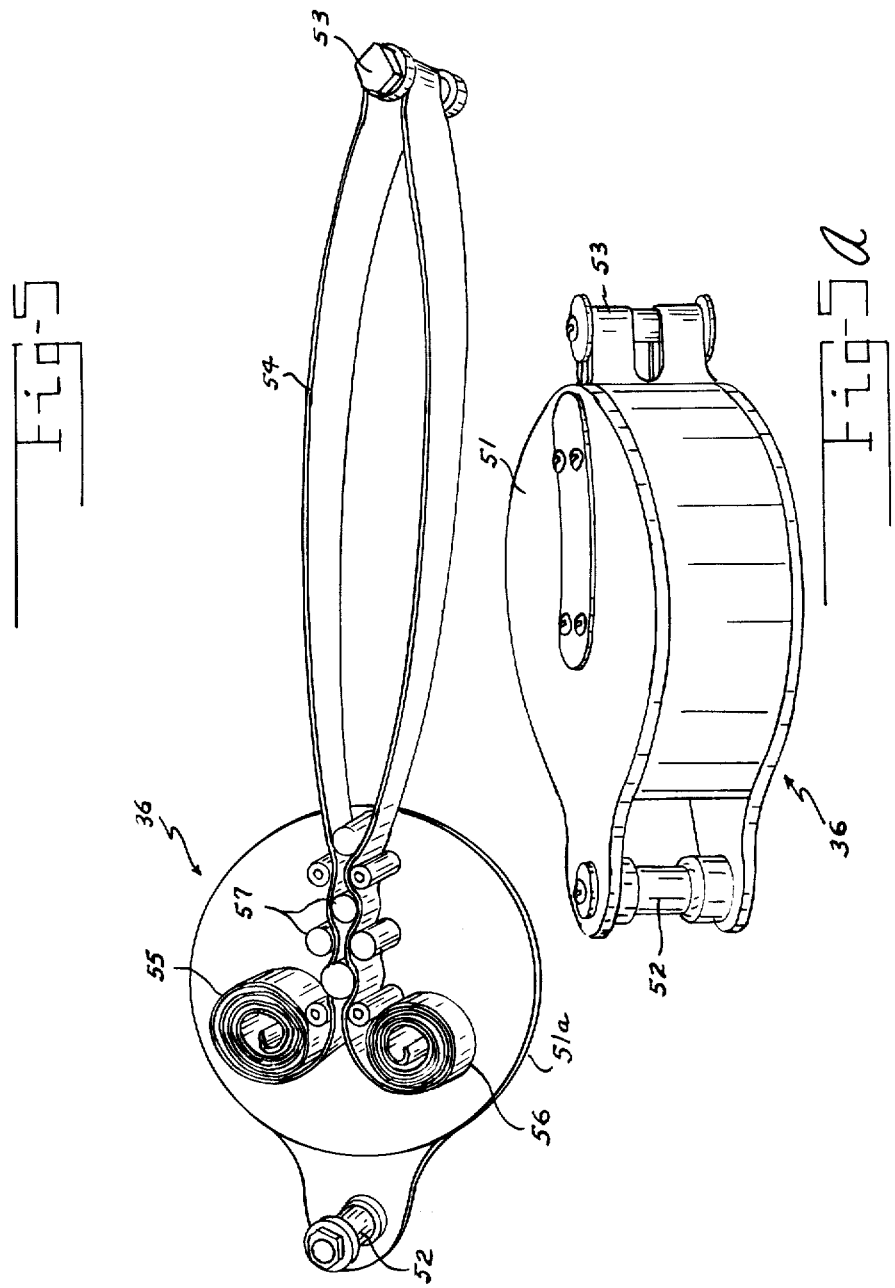

INTEGRAL AIRCRAFT BARRIER NET

RIGHTS OF THE GOVERNMENT

The invention described herein may be manufactured and used by or for the Government of the United States for all governmental purposes without the payment of any royalty.

BACKGROUND OF THE INVENTION

The present invention relates to the field of air cargo barrier nets that are placed between cargo mounted in an aircraft cargo compartment and the pilot, aircrew and/or passengers to act as a safety device in the event of the attempted shifting of the cargo as a result of a catastrophic event such as a forced belly landing or crash.

One problem involved in the air transport of cargo has been the shifting of such cargo particularly in the forward direction during a forced landing or other emergency such as a crash which causes a failure either in the cargo tiedown restraints or in the tiedown rings installed on the aircraft floor. Without the use of an additional barrier, the aircraft bulkhead dividing the cargo and pilot, aircrew and/or passenger compartments must bear the full brunt of the rapidly moving cargo. In the past, such bulkheads have proven relatively ineffective for this purpose, since they were usually designed only to resist the relatively minimal loads in a longitudinal direction as a result of relatively small shifts of cargo occurring during flight. Where, however, a significant forward shift of cargo occurred or where a failure of the cargo tiedown means resulted in a considerable impact thereagainst, the conventional bulkhead would rather easily fail and thus provide little or no protection. Another problem occurs when the passengers are seated in the cargo compartment forward or to one side of the cargo and no intervening bulkhead exists for their at least partial protection. In addition, for different trips, both the number of passengers and the amount of cargo can vary considerably requiring adjustment in the location of the supplementary protective system.

One solution to the above-outlined problem of bulkhead failure might be to improve its strength or resistance to significant impact loads in a longitudinal direction by conventionally enlarging the size of the main bulkhead members. Of course, this technique would indeed increase bulkhead strength; however, the increased size and bulkiness resulting therefrom would suffer from the dual disadvantages of adding undesirable weight to the aircraft and subtracting from the available cargo space. Another solution is described in U.S. Pat. No. 2,669,402, where a high strength cable network is inherently incorporated within the bulkhead and, in accordance with the teaching of this patent, enables the maintenance of a relatively thin and lightweight bulkhead with, however, the strength and resistance of the latter to longitudinally-applied impact loads appearing to have been significantly increased.

A third solution to the aforementioned problem is that presented by the present invention; namely, positioning a barrier net in a restraining position against the forward end of the cargo. In this connection, U.S. Pat. No. 3,486,723, teaches the use of such a cargo barrier net. However, the latter net, which is considered to be representative of the state-of-the-art and commercially available nets, consists of a series of webbing strips 18 which emanate from a central point in a radially-outward direction to collectively terminate in a substantially circular configuration, except for a flattened bottom net surface, that requires a series of tiedown rings or hard points to be installed completely around the inside circumference of the aircraft fuselage within the cargo compartment and to which the numerous outer ends of the aforementioned series of radial webbing strips 18 would have to be respectively and individually attached. Naturally, the use of such a circular or substantially circular series of tie-down rings or hardpoints for the webbing strips 18 would require a considerable modification to either newly designed of existing aircraft with, moreover, a significantly increase in weight resulting therefrom. Furthermore, should one desire to be able to relocate or adjust such a barrier net, as disclosed in the aforementioned U.S. Pat. No. 3,486,723, to various positions in the cargo compartment, as could easily be required for cargo loads of different sizes and/or shapes or when the cargo compartment would not be fully loaded, it would be necessary to install a separate series of tiedown rings or hard points completely around the aircraft fuselage for each desired or required position of the barrier net, necessitating a quite extensive further modification of, and greatly increased weight to the aircraft. Moreover, this technique would involve a considerable expenditure of both time and effort in releasing each webbing strip 18 from its previous attachment, and then shifting to a new position and reattaching each of the said webbing strips 18 to the hard points at the adjusted position. On the other hand, the new and improved cargo barrier net of the present invention eliminates or, at least, substantially alleviates the above-noted problems by a unique and yet greatly simplified means to be set forth hereinafter in the following summary and detailed description.

SUMMARY OF THE INVENTION

This invention consists in a new and improved air cargo-barrier net disposed in the cargo compartment of a cargo aircraft aft of the bulkhead and in restraining contact against the forward end of the cargo, and including a main, cargo-restraining front net section positioned in transverse and contacting relation with and across the forward end of the cargo, a top cargo-restraining net section integrally attached to the main net section and positioned over the forward portion of the top of the cargo, and quick-releasable, connecting lines between the front and top net sections, and standard tiedown rings on the aircraft floor. The top surface of the front net section is interconnected with, and slidably positioned on a pair of conventional-type of horizontal rails or tracks mounted on the ceiling of the cargo compartment and thereby providing for the relatively easy adjustment or relocation of the net to various positions in the cargo compartment.

Other objects and advantages of the present invention will appear self-evident hereinafter in connection with the following disclosure, taken with the accompanying drawings, in which:

BRIEF DESCRIPTION OF THE DRAWINGS

FIG. 3 is another relatively enlarged view, partly schematic and more clearly showing details of the inventive barrier net per se with the top barrier net section thereof having been omitted for the sake of clarity;

FIGS. 5 and 5a respectively represent assembled and partially disassembled views of a standard load limiter that may be utilized in the connecting lines between the barrier net of the present invention and existing tie-down rings installed in the aircraft floor.

DESCRIPTION OF THE PREFERRED EMBODIMENT

Figure 1:
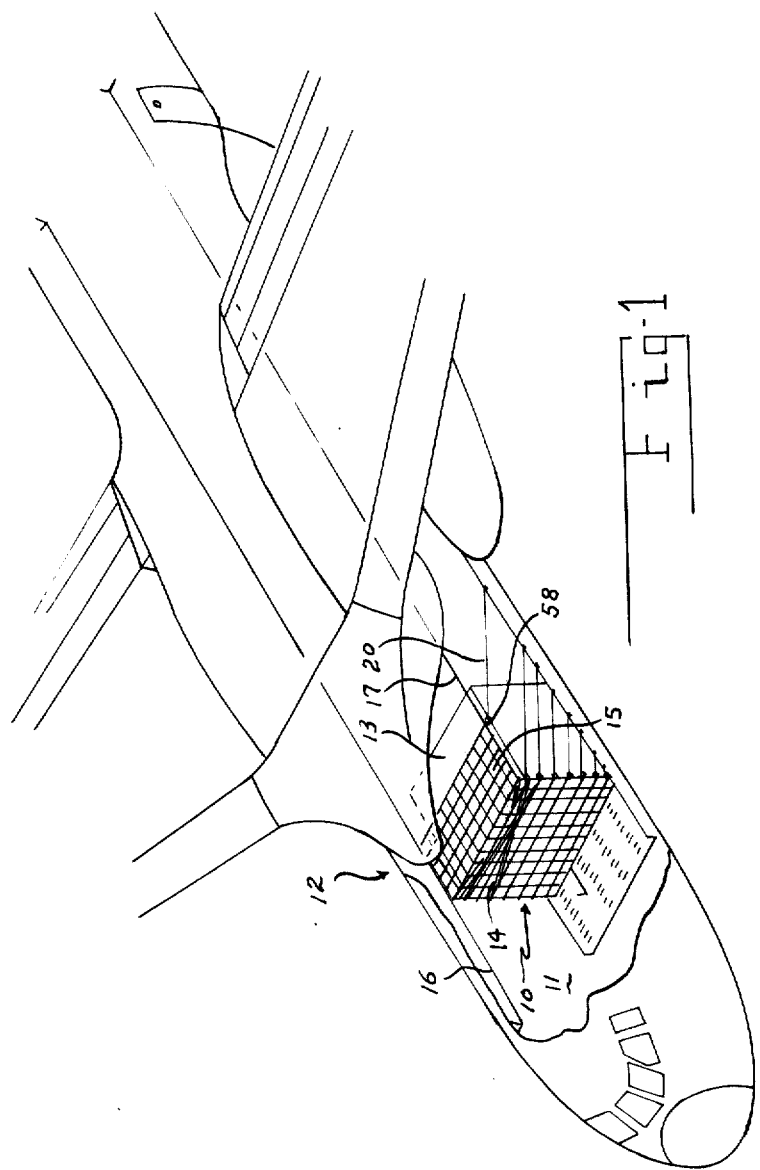
FIG. 1 represents a schematic and partly broken-away view, illustrating the new and improved cargo barrier net of the present invention shown in a typical installation in a U.S. Air Force C-141-type cargo aircraft.

Referring generally to the drawings and, in particular, to FIG. 1 thereof, the new and improved barrier net of the present invention is indicated generally at 10 as being positioned in the cargo compartment 11 of an appropriate cargo aircraft, such as the C-141 indicated generally at 12, in contact and restraining relation against the forward end of a cargo load 13. Barrier net 10 comprises a main, cargo-restraining, front net section 14, which constitutes the principal emergency restraint provided by the present net to the forward movement of the cargo load 13, should the main tie-down restraints or aircraft integral restraint system, for example, of the latter fail during an emergency, and an auxiliary or top net section 15 which, when installed, is designed to prevent the cargo load, as at 13, from coming over the top of the said front net section 14 during an aircraft crash, for example, and when the main tie-down restraints or aircraft integral restraint system for the cargo load 13 should fail to hold it in its loaded position. A pair of conventional horizontal tracks or rails, seen in phantom at 16 and 17, may be easily installed on the ceiling of the cargo compartment 11 and to which may be slidably attached the upper surface of the front net section 14 by more or less conventional means to be further described hereinafter.

Figure 2:
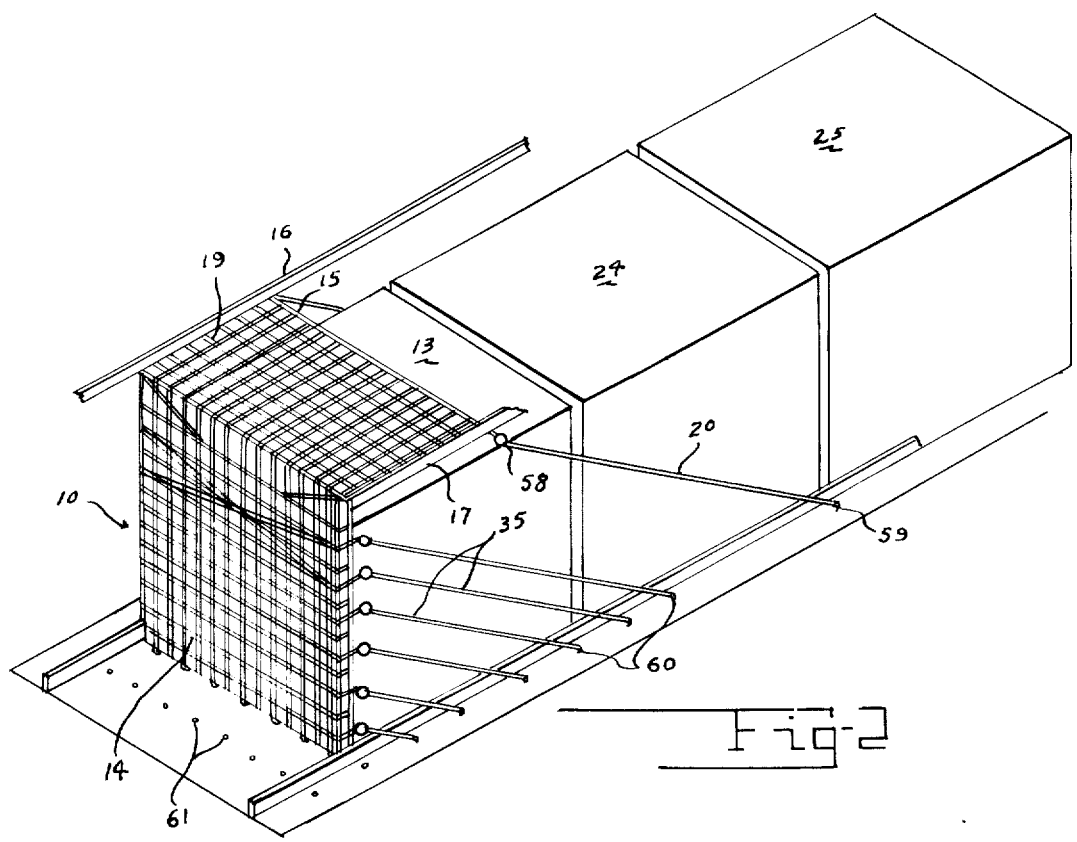
FIG. 2 is a relatively enlarged fragmentary view, partly broken-away and schematic, more clearly depicting the installation of the barrier net of FIG. 1.

As is seen more particularly in FIGS. 2 and 3, the front barrier net section 14, shown with the top barrier net section 15 omitted in FIG. 3 for the sake of clarity, may preferably be comprised of a first series of parallel, evenly spaced-apart and horizontally extending woven webbings or rope sections, as at 26 (FIG. 3), and a second series of parallel, evenly spaced-apart and vertical extending webbings or rope sections, as at 27, which naturally cross at right angles to, and are interlocked or interconnected with the first-named webbings 26 at each crossing point therebetween. Collectively the said horizontal and vertical webbings 26 and 27 form a rectangular-shaped configuration and, more importantly, eliminate the radial webbing configuration of the prior art and/or commercially available nets.

In a unique and further important characteristic of the present arrangement, the previously-referred to top barrier net section 15 is used, as hereinbefore noted, to substantially prevent a rapidly shifting cargo load, such as that previously referred to at the reference numeral 13 (FIG. 2) or if there are a series of such cargo loads to include those indicated at 24 and 25, as well, from being thrown over the top of the front barrier net section 14. Top barrier net section 15, which is uniquely made integral with and is basically formed by the upward extensions of the vertical webbings 27 of the said front barrier net section 14, of course, also similarly includes a series of interlocking, horizontal webbings or rope sections, as is depicted at 19, for example. Also, a side-interconnecting webbing or rope line is used, as at 20, for attaching each side of the top barrier net section 15 to an appropriate and conventional tiedown ring on the aircraft floor.

To provide for the attachment of the front barrier net section 14 to the pair of ceiling-mounted, horizontal rails or tracks, as at 16, 17, and upper, front barrier net-attaching portion, indicated generally at 18 (FIG. 3), may be utilized. Net attaching-portion 18 incorporates a single webbing or rope section 28 that may be preferably disposed in a somewhat spaced relation above the top horizontal webbing 29 of said barrier net section 14 and integrally attached to the latter through means of its opposite corners or ends adjacent or substantially adjacent the tracks or rails 16 and 17 and being formed on upper vertical webbing-extensions 27a and 27b of the left and right side-most vertical webbings of the plurality at 27. The normal integral attachment of the opposite ends of the single horizontal webbing 28 to front barrier net section 14 is further strengthened by a pair of relatively short, reinforcing webbings 30 and 31 that extend between and interconnect the said opposite ends of the webbing 28 with the topmost horizontal webbing 29 of the net section 14. Similarly, the upper portion of barrier net section 14 is strengthened by the incorporation of the relatively long and crossing webbings, seen clearly at 32 and 33.

Figure 4:
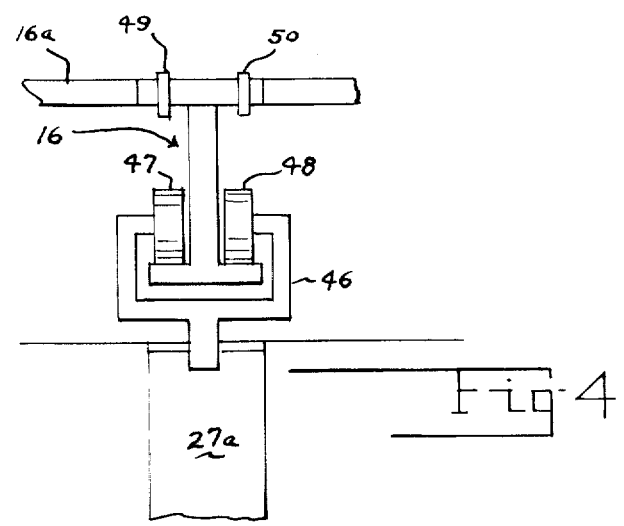
FIG. 4 is an end view, relatively enlarged and partly schematic, illustrating details of one type of typical attachment means that may be used to attach the main front net section of the inventive barrier net to a pair of conventional horizontal tracks or rails mounted to the ceiling of the aircraft cargo compartment.

Formed as a further vertically-upward extension of, or otherwise appropriately webbing-attached to the vertical webbing-extensions 27a and 27b may be a standard type of depending roller mount or bracket, as at 46 for extension 27a for mounting a pair of rollers 47 and 48, as seen in FIG. 4, which constitutes one principal portion of a more or less conventional-type of industrial overhead conveyor, the other principal portion thereof being the horizontal track or rail 16. Of course, a similar conveyor would be used with the vertical extension 27b, and incorporate the other track or rail 17. As is depicted in said FIG. 4, the track or rail 16 would preferably be of an I-beam construction that may be bolted as at 49 and 50, or otherwise attached at its upper end to the ceiling, depicted in schematic and broken-away form at 16a, of the aircraft cargo compartment. Because of its I-beam configuration, the rail or track 16 naturally forms oppositely-disposed track portions on its lower end, as is clearly depicted and against which the rollers 47 and 48 are captured and respectively slidably mounted. With this simplified but unique use of an overhead industrial type of conveyor comprising the horizontal tracks or rails 16 and 17 and the previously described roller mount, in novel combination, with the front barrier net section 14 of the inventive barrier net 10, it is a relatively simple and quick matter to relocate or adjust the inventive net to any of a number of different positions in the aircraft cargo compartment merely by releasing certain side and bottom connecting lines, to be further disclosed and which are located between the inventive net and already-existing tiedown rings, which in a conventional aircraft, such as the C-141 or C-130, are located at 20 inch intervals along the aircraft floor. These tiedown rings are of standard design and are therefore not shown. In existing cargo aircraft, they are installed in the cargo compartment along the sides and in transverse relation to, and at the aforementioned regular 20 inch intervals, as is depicted schematically at the locations respectively marked, for example, by the reference numerals at 60 and 61.

The aforementioned connecting lines, which constitute a further unique feature and part of the overall combination of the present invention, actually comprise a novel series of left and right side-attachment webbings or rope sections, as indicated respectively and generally at 34 and 35 (Note particularly FIG. 3) and which preferably consist of integral left and right extensions of alternate and selected webbings or rope sections of the horizontally-disposed series thereof previously referred to and indicated generally at 26 and included in the front barrier net section 14. Thus, as is depicted clearly in the aforementioned FIG. 3, the said left and right side webbing or rope section-extensions begin with the topmost horizontally-disposed webbing or rope section 29 and include every odd number thereafter from the top to the bottom thereof, as is indicated respectively at 34a, b, c, d, e and f, and at 35a, b, c, d, e, and f. Each of these side connecting webbings or rope sections, which may be hereinafter referred to simply as left and right side-connecting lines, as indicated generally at 34 and 35, may include or incorporate therewithin load limiters, as is depicted schematically at 36 and 37, which may be of conventional design, such as for example, that of the Van Zelm Division of the Entwistle Co, and which is depicted in FIGS. 5 and 5a. As viewed in the latter figures, each of the load limiters, as at 36, may consist of a main load limiter-outer casing 51 a first, fixed fastener means at 52 on one side and to which may be webbing attached a corresponding end of the side-connecting lines as at 35, for example, that is nearest to the front barrier net section 14, and a second, oppositely-disposed movable fastener means at 53 around which may be attached one end of the remainder of the corresponding side-connecting line, as at 35, that would be attached to the tiedown ring installed on the aircraft floor. As is seen specifically in FIG. 5, the movable fastener means 53 is also connected to a loop portion of a flat metal band 54 that has a substantial portion of each of its opposite ends wound up into the dual coiled windings, indicated respectively at 55 and 56, and disposed on the bottom plate 51a. Mounted on the said bottom plate 51a are a series of guide and metal band-restricting rollers that are arranged in matching pairs, as at 57, and are further disposed in a close enough relation to each other to thereby provide a considerable resistance to the movement therethrough of the metal band 54 which, as is clearly seen in the aforementioned FIG. 5, has been installed therebetween in alternate manner. In this way, should a load be applied to the side connecting lines, as at 34 and 35, each of the metal bands, as at 54, installed on each connecting line would be automatically extruded or pulled through the abovereferred to closely associated pulleys 57, the considerable restricting action of which providing for a greatly significant absorption of the energy involved during the operation of the inventive barrier net 10 to resist an impact load from the cargo load, as at 13, which it is intended to restrain.

As is particularly illustrated in the aforementioned FIG. 3, the left and right side-connecting lines 34, 35 vary in length in descending order from top to bottom with, therefore, the longest line thereof being those indicated at 34a and 35a and the shortest at 34f and 35f. Of course, this difference in length is obviously required since, in accordance with the unique teachings of the present invention, the main, cargo-restraining net section 14 is held in position against a selected cargo load, first, by means of the simple attachment of the single, horizontal webbing or rope section 28 thereof to the ceiling-mounted tracks or rails 16, 17, and, secondly, to already-existing tiedowns mounted as a standard feature on the cargo floor of the particular aircraft, at the previously-referred to regular intervals. In the C-130 or C-141 aircraft, for example, these are 25,000 pound cargo tiedowns which would extend along the sides of the cargo compartment floor and to which the said left and right side-connecting lines, 34 and 35, would be respectively attached. As noted hereinbefore, these tiedown positions are indicated generally at 60. In addition, the front or bottom edge of the main, cargo-restraining net section 14 would also be attached, in the case, again, of the C-130 or C-141, to 10,000 pound tiedowns, also, already-installed across the existing aircraft cargo compartment-floor at the regular intervals generally denoted at 61. As in the case of the side tiedown-connecting lines 34 and 35, the bottom edge of the net section 14 could be attached to the said 10,000 pound tiedowns by extending alternate vertically-disposed webbings of the plurality at 27. For the latter purpose, the tiedown means on the ends of both the side connecting lines 34, 35, as well as those vertically-extended lines on the bottom edge of the main net section 22, would simply consist of conventional spring hooks, indicated generally and somewhat schematically at 38–41, inclusive, for the said bottom edge and at 44a–44f and 45a–45f, respectively for the left and rightside-connecting lines 34, 35.

With further regard to the left and rightside-connecting lines 34 and 35, it is noted that a single, interconnecting webbing or line, as respectively indicated at 42 and 43, has been utilized to interconnect the outer end portions of each of the individual left and right side-connecting lines 34 and 35 to thereby positively retain the individual side-connecting lines 34 and 35 in parallel relation to each other and at an appropriate and predetermined spacing, and thus generally provide a more stable overall attachment of the main, cargo-restraining front net section 14 to the side-tiedowns already installed on existing cargo compartment-floors. Moreover, the use of the interconnecting lines at 42 and 43 further facilitate and strengthen the attachment of each of the left and right side-connecting lines 34a-f and 35a-f to the said tiedowns. Of course, a similar pair of connecting lines, one of which has been previously-referred to at 20 would be used with the appropriate load limiter, as at 58 (FIG. 2), to quick-releasably attach and install the top barrier net section 15 in its correct position over the top surface of the cargo load being restrained by the invention. Naturally, the line 20 would be equipped with an appropriate snap hook (not shown) on its end which would be releasably attached to a conventional tiedown ring, installed on the aircraft floor at 59.

Thus, a new and improved unitary cargo-barrier net has been developed by the present invention that is uniquely fabricated of a one-piece construction and which further requires only the simple modification of existing cargo aircraft or alternately, the addition to newly designed cargo aircraft of a single set of tracks or rails mounted in the ceiling of the cargo compartment, and which further utilizes already-existing cargo tiedowns and therefore may be easily repositioned or adjusted to various positions in the aircraft cargo compartment simply by rather easily and quickly disconnecting the spring-urged hook fasteners, as at 38–41 formed on the side-connecting lines 34 and 35, for example, for the front net section 14 and as at 58 for the top net section 15, and then rapidly moving the entire barrier net 10 to the next position in the cargo compartment, simply by virtue of the slidable engagement of the rollers, as at 47 and 48 (FIG. 4), mounted on top of the front barrier net section 14; with the ceiling-mounted horizontal tracks, as at 16. To complete this adjustment to the new position requires only the simple reconnection of each of the spring fastener-hooks, as at 38–41, to the appropriately located tiedown rings which are installed on the aircraft floor at regular 20-inch intervals, for example.

I claim:

1. Barrier net means for resisting movement of cargo loaded in the cargo compartment of an aircraft or other vehicle comprising; a main, vertically-disposed, front barrier net section positioned in contact with, and providing the principal emergency restraint for the cargo in the event of the failure of the normal aircraft cargo restraint system; an auxiliary, top barrier net section integrally joined with opposite top corner extensions of said main, front barrier net section, and disposed in a horizontal relation over and in restraining contact with a substantial portion of the upper surface of, and thereby positively ensuring a significant emergency restraint to the tendency of said cargo to tumble over the top of the said main, front barrier net section in the event of a crash or other emergency resulting in the failure of the normal cargo restraints; fixed barrier net-attachment means mounted to the ceiling of the cargo compartment and providing the sole attachment to the aircraft for the top surface and said main front barrier net section; movably-positioned, barrier net-attachment means integrally formed with top corner extensions of said main, front barrier net section and interconnected in slidable relation with said fixed, barrier net-attachment means for simultaneously positioning said main, front barrier net section in its vertically-upright and principal cargo load-restraining position, and further providing for, and greatly facilitating its relatively easy and quick adjustment to various cargo load-restraining positions in the cargo compartment; a plurality of fixed and quick-releasable cargo restraint means interconnected between the opposite side and bottom surfaces of said main, front barrier net section and already-existing and periodically-spaced cargo compartment-floor-mounted, fastening means and thereby ensuring the positive hold of the said main, front barrier net section in its vertically-upright, cargo load-restraining position; and a single pair of fixed and quick-releasable cargo restraint means respectively interconnected one each between other already-installed and regularly-spaced cargo restraints on the aircraft cargo compartment floor and one each with opposite end corners of, and thereby positively retaining said auxiliary, top barrier net section in its horizontally-disposed and cargo-restraining relation over the upper surface of said cargo load.

2. Barrier net means for resisting movement of cargo as in claim 1, wherein said main, front barrier net section comprises a first plurality of horizontally-disposed webbings or rope sections positioned in spaced-apart and parallel relation to each other; a second plurality of vertically-disposed webbings or rope sections positioned in spaced-apart and parallel relation to each other and further crossing and interconnecting with the horizontally-disposed webbings or rope sections corresponding thereto; and an upper barrier net portion comprising; a single, horizontally-disposed webbing or rope section disposed in spaced relation above the main portion of said front, barrier net section and integrally connected to and in transverse relation with vertical extensions from the left and right side-most vertically-disposed webbings or rope sections; a first pair of relatively short, reinforcing webbings or rope sections extending between and interconnecting opposite ends of and thereby significantly strengthening said single, horizontally-disposed webbing or rope section; said single and reinforced, horizontally-disposed webbing or rope section being further interconnected with and constituting an integral part of said movably-positioned, barrier net-attachment means; and a second pair of relatively long and crossing webbings or rope sections interconnected between opposite top sides of, and thereby strengthening said main, front barrier net section at the uppermost portion thereof immediately below and spaced from said single, horizontally disposed webbing or rope section.

* * * * *